United States Patent

Hsu

[11] Patent Number: 6,018,495
[45] Date of Patent: Jan. 25, 2000

[54] METHOD OF BOREHOLE COMPENSATION OF EARTH FORMATION CHARACTERISTIC MEASUREMENTS USING DEPTH MEASUREMENTS

[75] Inventor: Kai Hsu, Sugar Land, Tex.

[73] Assignee: Schlumberger Technology Corporation, Sugar Land, Tex.

[21] Appl. No.: 08/971,509

[22] Filed: Nov. 17, 1997

[51] Int. Cl.[7] .................................................. G01V 1/40
[52] U.S. Cl. .............................. 367/30; 367/48; 367/57
[58] Field of Search .............................. 367/28, 34, 33, 367/27, 25, 29, 30, 35, 48, 57

[56] References Cited

U.S. PATENT DOCUMENTS

| | | |
|---|---|---|
| 4,346,460 | 8/1982 | Schuster . |
| 4,543,648 | 9/1985 | Hsu . |
| 4,594,691 | 6/1986 | Kimball et al. . |
| 4,809,236 | 2/1989 | Hsu et al. . |
| 4,930,109 | 5/1990 | Kyle ........................................... 367/27 |
| 5,361,239 | 11/1994 | Zoeller . |

*Primary Examiner*—Christine Oda
*Assistant Examiner*—Anthony Jolly
*Attorney, Agent, or Firm*—Wayne I. Kanak; Victor H. Segura; Albert J. Adamcik

[57] ABSTRACT

A method is disclosed for borehole compensation of measurements of earth formations penetrated by a borehole including differential time ($\Delta t$) measurements obtained from a borehole tool in the formation. The borehole tool includes at least one transmitter and a plurality of receivers spaced apart from each transmitter. Each transmitter generates a waveform, and the receivers are responsive to the waveform. A receiver array $\Delta t$ measurement is generated for a depth interval spanned by the receivers by cross-correlating receiver array waveforms relevant to the spanned depth interval. A synthesized transmitter array $\Delta t$ measurement corresponding to the spanned depth interval is generated by cross-correlating selected transmitter array waveforms. The transmitter array waveforms are selected corresponding to the spanned depth interval by identifying the receiver arrays whose transmitter locations fall within the spanned depth interval and identifying a set of waveforms from the identified receiver arrays to obtain the transmitter array waveforms. The receiver array $\Delta t$ measurement is averaged with the transmitter array $\Delta t$ measurement to obtain a borehole compensated $\Delta t$ measurement corresponding to each transmitter. When the borehole tool includes more than one transmitter, all the borehole compensated $\Delta t$ measurements corresponding to each transmitter are averaged to obtain a comprehensive borehole compensated $\Delta t$ measurement.

44 Claims, 6 Drawing Sheets

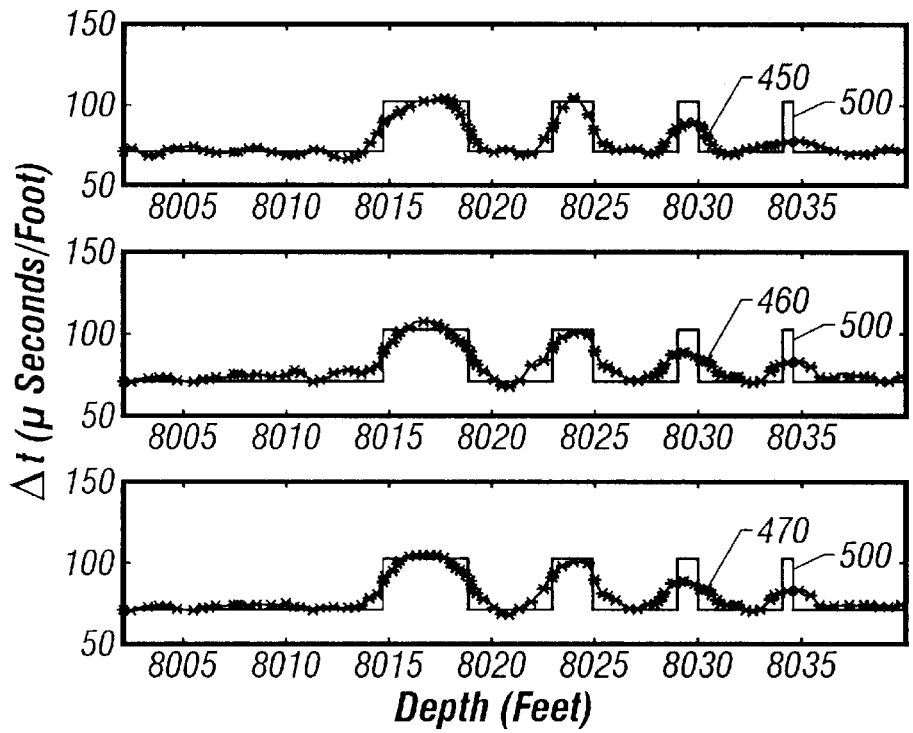
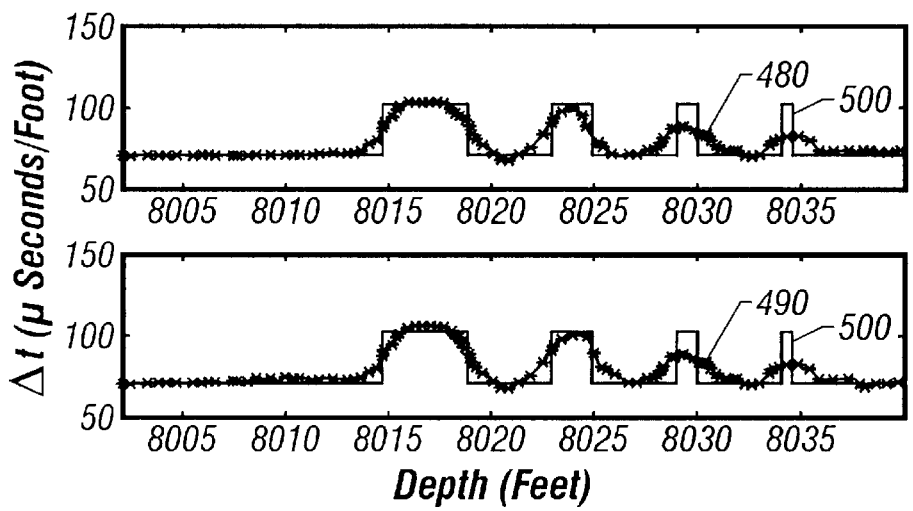

METHOD OF BOREHOLE COMPENSATION OF EARTH FORMATION CHARACTERISTIC MEASUREMENTS USING DEPTH MEASUREMENTS

BACKGROUND OF THE INVENTION

1. Field of the Invention

This invention relates to the field of measuring characteristics of earth formations penetrated by a borehole and sensing borehole parameters. More particularly, the invention relates to a method of borehole compensation of earth formation characteristic measurements.

2. Description of the Related Art

As a borehole tool positioned in a well borehole passes through various rock layers of the surrounding earth formation, hole rugosity, cave-ins and washouts affect the borehole tool measurements and are potentially a source of measurement error. Misinterpretation of formation characteristics complicates formation evaluation for exploitation of oil and gas resources. Borehole compensation removes the effect of borehole irregularities on certain formation measurements, such as acoustic or electromagnetic measurements.

For example, a majority of wells where logging-while-drilling is applied are either highly deviated or horizontal. Drilling a deviated or horizontal well requires a mud motor with steerable assembly to build the angle of well trajectory when necessary. It is well known that the borehole drilled by such a steerable assembly is a helical or corkscrew borehole with a periodicity of a few feet. The diameter of a helical borehole may vary by a few inches as well. Because the acoustic or electromagnetic measurements of interest are computed by the relative time delay of formation arrival signals between receivers on a borehole tool, the measurement's value is affected by the unequal mud path through which the formation arrival signals pass. Therefore, there is a need in the art to develop new techniques for borehole compensation to provide more accurate formation measurements, especially during exploration drilling operations.

SUMMARY OF THE INVENTION

A method is disclosed for borehole compensation of measurements of earth formations penetrated by a borehole including differential time ($\Delta t$) measurements obtained from a borehole tool in the formation. The borehole tool includes at least one transmitter and a plurality of receivers spaced apart from each transmitter. Each transmitter generates a waveform, and the receivers are responsive to the waveform. The waveforms are representative of, for example, acoustic waves or electromagnetic waves. A receiver array $\Delta t$ measurement is generated for a depth interval spanned by the receivers by cross-correlating receiver array waveforms relevant to the spanned depth interval. A synthesized transmitter array $\Delta t$ measurement corresponding to the same spanned depth interval is generated by cross-correlating selected transmitter array waveforms. The transmitter array waveforms are selected by identifying the receiver arrays whose transmitter locations fall within the spanned depth interval and identifying a set of waveforms from the identified receiver arrays to obtain the transmitter array waveforms.

Identifying a set of waveforms as the transmitter array waveforms includes selecting a depth above the spanned depth interval when the receivers are positioned above the corresponding transmitter, and below the spanned depth interval when the receivers are positioned below the corresponding transmitter. The closest receiver to the selected depth is determined from each identified receiver array. A new depth is then determined wherein the mean-squares distance to the new depth from the previously identified closest receiver of each identified receiver array is minimized. From each identified receiver array, the closest receiver to the new depth is then determined. The steps of determining a new depth and determining the closest receivers to the new depth are repeated until the mean-squares distance from the closest receivers to an aligned depth cannot be reduced. The resultant receivers are then most closely aligned at the aligned depth and the corresponding set of waveforms are the transmitter array waveforms.

The receiver array $\Delta t$ measurement is averaged with the transmitter array $\Delta t$ measurement to obtain a borehole compensated $\Delta t$ measurement corresponding to the spanned depth interval. The steps are repeated at each spanned depth interval of interest. When the borehole tool includes more than one transmitter, all of the borehole compensated $\Delta t$ measurements corresponding to the spanned depth interval are averaged to obtain a comprehensive borehole compensated $\Delta t$ measurement.

BRIEF DESCRIPTION OF THE DRAWINGS

The present invention may be better understood and its numerous objects, features, and advantages made apparent to those skilled in the art by referencing the accompanying drawings.

FIGS. 5A, 5B and 5C are logs illustrating, respectively, a receiver array $\Delta t$ log, a transmitter array $\Delta t$ log, and a resultant borehole compensated $\Delta t$ log according to the method of the present invention;

FIGS. 6A and 6B are logs illustrating, respectively, a receiver array $\Delta t$ log for an in-gauge borehole and a borehole compensated $\Delta t$ log for a helical borehole according to the method of the present invention.

The use of the same reference symbols in different drawings indicates similar or identical items.

DESCRIPTION OF THE PREFERRED EMBODIMENTS

Figure 1A:
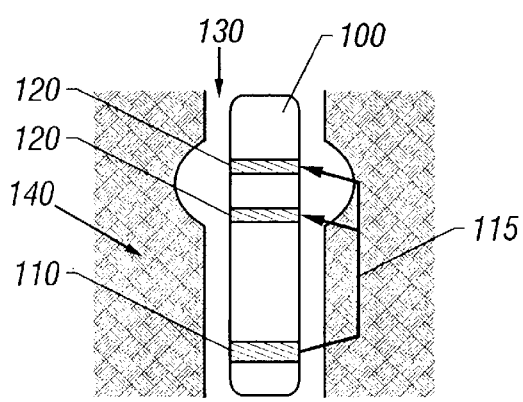
FIGS. 1A and 1B (labeled Prior Art) are schematic views of a borehole tool including one transmitter used in a borehole having a washout and illustrating the borehole tool in different positions within the borehole.
Figure 1B:
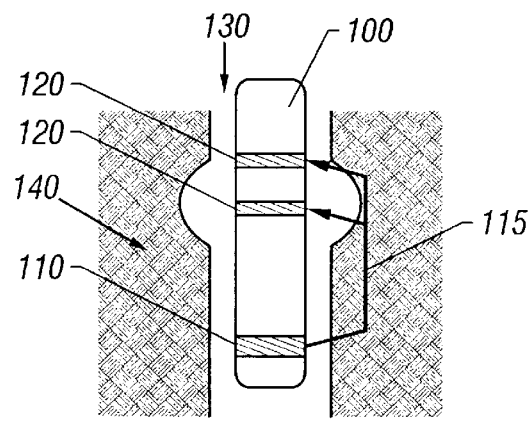

With reference to FIGS. 1A and 1B, a borehole tool 100 is shown suspended in a borehole 130 which is filled with drilling fluid (mud) and has a washout. The borehole tool 100 is illustrated in different positions within the borehole 130. The borehole tool 100 is adapted for movement up and down the borehole 130 and includes at least one source of energy, for example a transmitter 110, and may include additional transmitters. An array of energy detecting receivers 120 is shown on the borehole tool 100 spaced along the direction of the borehole axis. FIGS. 1A and 1B illustrate the transmitter 110 below the array of receivers 120; however, one or more transmitters 110 can be positioned above the receivers 120, or both above and below the receivers 120. A wave 115 is generated by the transmitter 110 and propagated into the surrounding earth formation 140 and is detected as it passes the receivers 120. The wave is, for example, an acoustic wave or an electromagnetic wave. In the case of an electromagnetic wave, the transmitter 110 and receivers 120 are typically termed a transmitting antenna and receiving antennas. The borehole tool 100 is, for example, suspended from a multiconductor cable (not shown) during a wireline logging operation, or is part of a drill string (not shown) during a logging-while-drilling operation.

Although the borehole tool 100 may be used to investigate a broad range of characteristics of the earth formation 140, the borehole tool 100 shown herein is particularly adapted for sonic investigation with an array of sonic receivers 120. In the case where a sonic investigation tool is used, the sonic receivers 120 are spaced from each other to form an overall receiver array that spans between the farthest receivers 120. As the borehole tool 100 is drawn up the borehole 130, as in a logging operation, or down through the borehole 130, as in a logging-while-drilling operation, the transmitter 110 is regularly operated to generate pulses of acoustic energy, or waves, part of which passes into or through the adjoining earth formation 140 and is detected by the receivers 120. The frequency of operation of the transmitter 110 may be varied and is generally selected so that each receiver 120 can at least detect arriving acoustic waves for a sufficiently long time to produce a waveform signal containing waves of interest, such as a compressional wave or shear wave.

Each receiver 120 detects arriving acoustic waves and produces a sonic waveform representative thereof. This waveform, when accurately detected, as is well known in the art, may provide significant information about the earth formation 140. The borehole tool 100 is in communication, for example, with a computer (not illustrated), which may be within the borehole tool 100, for processing the formation measurement information. Although the waveforms are preferably in digital format, they could be processed in analog form. The detection of energy or waves by the receivers 120 may take place at one time, and processing of the waveform signals in accordance with the invention may be done at a later time. Waveforms are typically recorded in tool memory and not transmitted to the earth's surface; however, if waveforms are transmitted to the surface in real-time, processing may be performed in real-time. The term "waveforms" or "waveform signals", as used herein, is intended to include both real-time and subsequent use of signals detected from the logging of a borehole.

Because the waveforms of interest are computed by the relative time delay of formation arrival between receivers 120 on the borehole tool 100, the value of the relative time delay, or Δt measurement, is affected by the unequal mud path lengths through which the wave passes. Depending on the locations of the receivers 120 relative to the washout, the effect of the unequal mud path lengths makes the estimated Δt measurement slower (FIG. 1A) or faster (FIG. 1B) than the true formation Δt measurement. For this reason, the helical borehole causes the sonic Δt measurement to fluctuate around the true formation Δt measurement. The technique of the present invention provides a depth-derived borehole-compensated Δt measurement in which the extraneous effect due to borehole irregularity, such as cave-ins, washouts, and helical boreholes, is eliminated.

Figure 2:
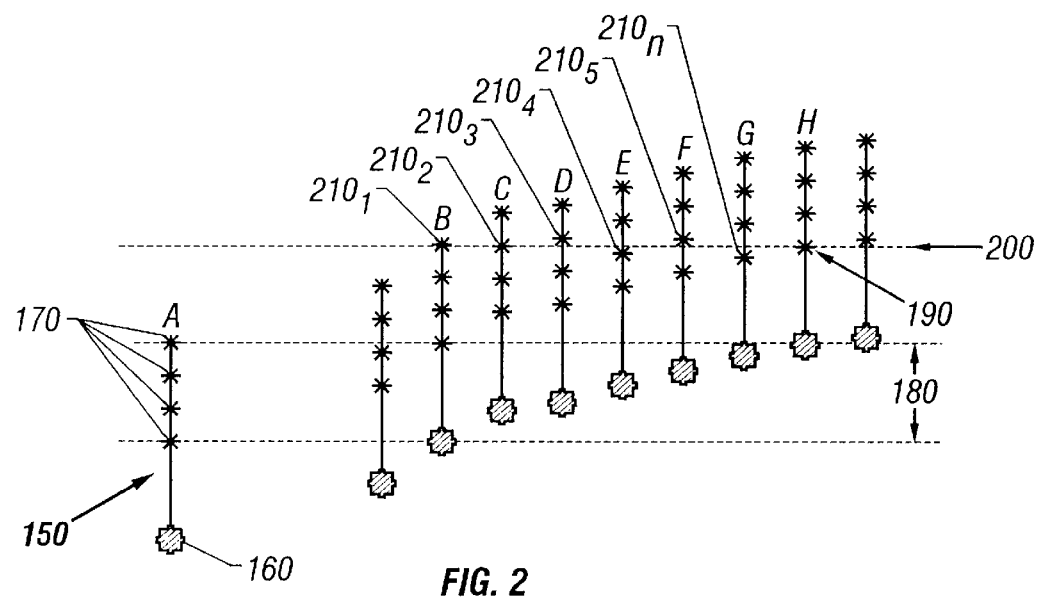
FIG. 2 schematically illustrates a borehole tool having a plurality of receivers located above a single transmitter at various depth locations unwrapped laterally.

With reference to FIG. 2, a borehole tool 150, such as a sonic logging-while-drilling tool, is illustrated schematically indicating a single transmitter 160 and an array of four receivers 170 positioned above and apart from the transmitter 160. While drilling, arrays of sonic waveforms are acquired at various depth locations. The borehole tool 150 is illustrated at various depth locations unwrapped laterally with the upper right-hand side at a shallower depth and the lower left-hand side at a deeper depth. At each depth location, an array of four waveforms is acquired by the receivers 170 and the formation Δt measurement is estimated by processing the receiver array waveforms. The processing methods are, for example, typically multichannel methods which involve cross-correlating the waveforms routinely used to generate sonic logs such as, for example, the processing method disclosed in U.S. Pat. No. 4,594,691, which is incorporated herein by reference. When the borehole is in-gauge and the tool is centered, the estimated Δt measurement will be equal to the true formation Δt measurement value. However, the presence of cave-ins or washouts biases the Δt measurement from the true formation Δt measurement value.

For each receiver array, the method of the present invention includes synthesizing a new array of waveforms from the waveforms acquired at various depth locations corresponding to different firings of transmitter 160, referred to as transmitter array waveforms. For example, for a given depth interval 180 spanned by the receiver array "A", selecting the transmitter array waveforms includes identifying all the receiver arrays whose transmitter 160 locations fall within the spanned depth interval 180, such as, for example, the receiver arrays "B" through "H" in FIG. 2. The identified receiver arrays are located at shallower depths when the transmitter 160 is positioned below the receivers 170 as in FIG. 2. A set of waveforms from the identified receiver arrays are selected to obtain the transmitter array waveforms.

The transmitter array waveforms are selected using an iterative least-squares procedure including selecting a depth above the spanned depth interval 180 when the receivers 170 are positioned above the transmitter 160 as shown in FIG. 2. Preferably, the selected depth corresponds to the depth of the first receiver 190 nearest the transmitter 160 of the receiver array at the shallowest depth, shown in FIG. 2 as receiver array "H". The closest receiver to the selected depth from each of the remaining receiver arrays (receiver arrays "B" through "G") is determined. A new depth is then determined wherein the mean-squares distance to the new depth from the previously identified closest receiver of each identified receiver array is minimized. The closest receiver from each identified receiver array to the new depth is then determined. The steps of determining a new depth and determining the closest receiver from each identified receiver array to the new depth are repeated until the mean-squares distance from the closest receivers to an aligned depth 200 cannot be reduced. The set of waveforms corresponding to the resultant closest receivers to the aligned depth 200 are the transmitter array waveforms. The steps for selecting the transmitter array waveforms usually converge in a few iterations and ensures that the identified transmitter array and waveforms are closely aligned at the same depth.

To further refine a close alignment of transmitter array waveforms, those receivers with a distance larger than a selected threshold distance to the aligned depth 200 are eliminated from the final selection of waveforms. For example, the final selected transmitter array waveforms are indicated by receivers $210_1, 210_2, \ldots 210_n$ in each identified receiver array, respectively, in FIG. 2. Note that the number of receivers chosen for the transmitter array may not be a constant, but a minimum of two is required for the subsequent processing.

Figure 3:
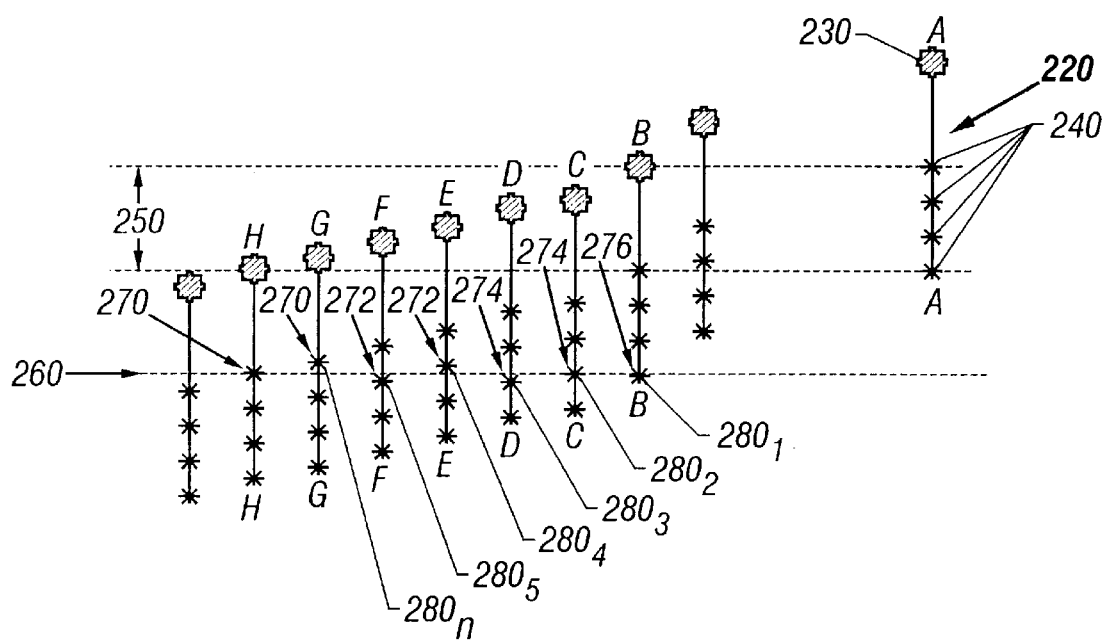
FIG. 3 schematically illustrates a borehole tool having a plurality of receivers located below a single transmitter at various depth locations unwrapped laterally.

With respect to FIG. 3, a borehole tool 220, such as a sonic logging-while-drilling tool, having a single transmitter 230 and an array of four receivers 240 positioned below and apart from the transmitter 230, is illustrated at various depth locations unwrapped laterally with the upper right-hand side at a shallower depth and the lower left-hand side at a deeper depth.

At each depth location, an array of four waveforms is acquired by the receivers 240, and the formation Δt measurement is estimated by processing the receiver array waveforms. The transmitter array waveforms for a given depth interval 250 spanned by the receiver array "A", are selected by identifying all the receiver arrays whose transmitter locations fall within the spanned depth interval 250, such as, for example, the receiver arrays "B" through "H" in FIG. 3. The identified receiver arrays are located at deeper depths when the transmitter 230 is positioned above the receivers 240 as in FIG. 3. A set of waveforms from the identified receiver arrays is selected to obtain the transmitter array waveforms.

Using the iterative least-squares procedure described in connection with FIG. 2, the transmitter array waveforms are selected for the borehole tool 220 in FIG. 3. A depth is selected below the spanned depth interval when the receivers 240 are positioned below the transmitter 230 as shown in FIG. 3. Preferably, the selected depth corresponds to the depth of the first receiver 270 nearest the transmitter 230 of the receiver array at the deepest depth, shown in FIG. 3 as receiver array "H". The closest receiver to the selected depth from each of the remaining receiver arrays (receiver arrays "B" through "G") is determined. A new depth is then determined wherein the mean-squares distance to the new depth from the previously identified closest receiver of each identified receiver array is minimized. The closest receiver from each identified receiver array to the new depth is then determined. The steps of selecting a new depth and determining the closest receiver from each identified receiver array to the new depth are repeated until the mean-squares distance from the closest receivers to an aligned depth 260 cannot be reduced. The set of waveforms corresponding to the resultant closest receivers to the aligned depth 260 are the selected transmitter array waveforms.

The steps for selecting the transmitter array waveforms usually converge in a few iterations and ensures that the identified transmitter array and waveforms are closely aligned at the same depth. To further refine a close alignment of transmitter array waveforms, those receivers with a distance larger than a selected threshold distance to the aligned depth 260 are eliminated from the final selection of waveforms and, for example, the final selected transmitter array waveforms are indicated by receivers $280_1, 280_2, \ldots 280_n$ in each identified receiver array, respectively, in FIG. 3.

A transmitter array Δt measurement is obtained by processing the selected transmitter array waveforms. Ideally, it is desirable to choose the waveforms whose receivers are exactly aligned at the same depth; however, with sonic logging-while-drilling, this is complicated by the constantly varying drilling rate of penetration. If the rate of penetration is slow, a larger number of receivers (or waveforms) may be selected for the transmitter array waveforms. As a result, the speed of processing would be slowed significantly. To remedy this shortcoming, the waveforms from the same receiver are averaged since the waveforms recorded by the same receiver have the same transmitter-to-receiver distance. For example, in FIG. 3, two waveforms are recorded by the first receiver 270 (in receiver arrays "H" and "G") and the two waveforms are averaged to produce one waveform which reduces the computational burden. Also, for example, two waveforms are recorded by the second receiver 272 (in receiver arrays "F" and "E") and averaged, and two waveforms are recorded by the third receiver 274 (in receiver arrays "D" and "C") and averaged to reduce the computational burden. However, in the illustration of FIG. 3, the fourth receiver 276 (in receiver array "B") records only one waveform.

The receiver array Δt measurement and the transmitter array Δt measurement are averaged to obtain the borehole compensated Δt measurement. The steps are repeated at each spanned depth interval of interest in the borehole. If the borehole tool includes more than one transmitter (not illustrated), then the borehole compensated Δt measurement is obtained corresponding to each transmitter and all of the borehole compensated Δt measurements are averaged together to obtain a comprehensive borehole compensated Δt measurement.

Figure 4A:
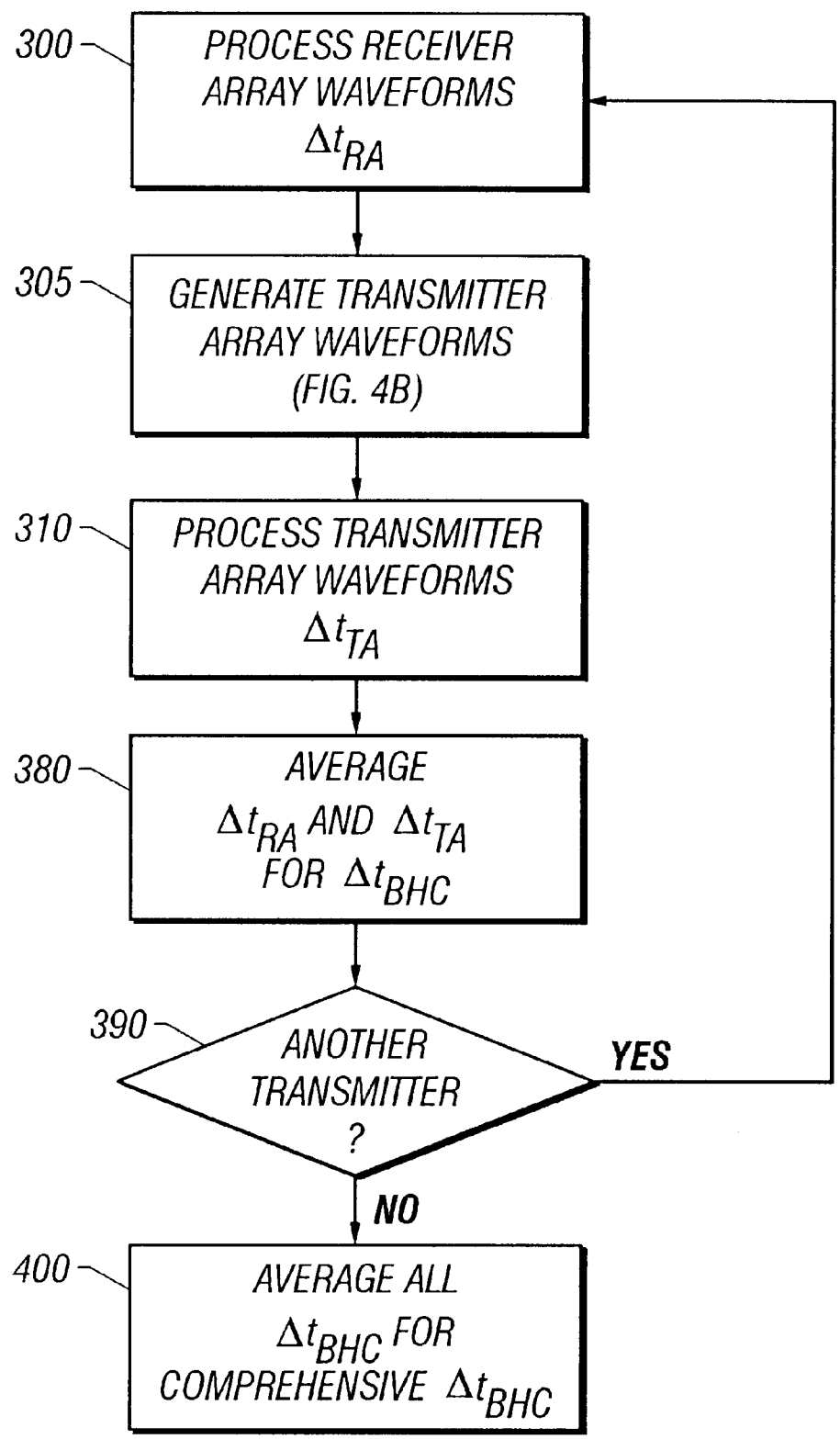
FIGS. 4A and 4B are flowcharts illustrating the method of the present invention.
Figure 4B:
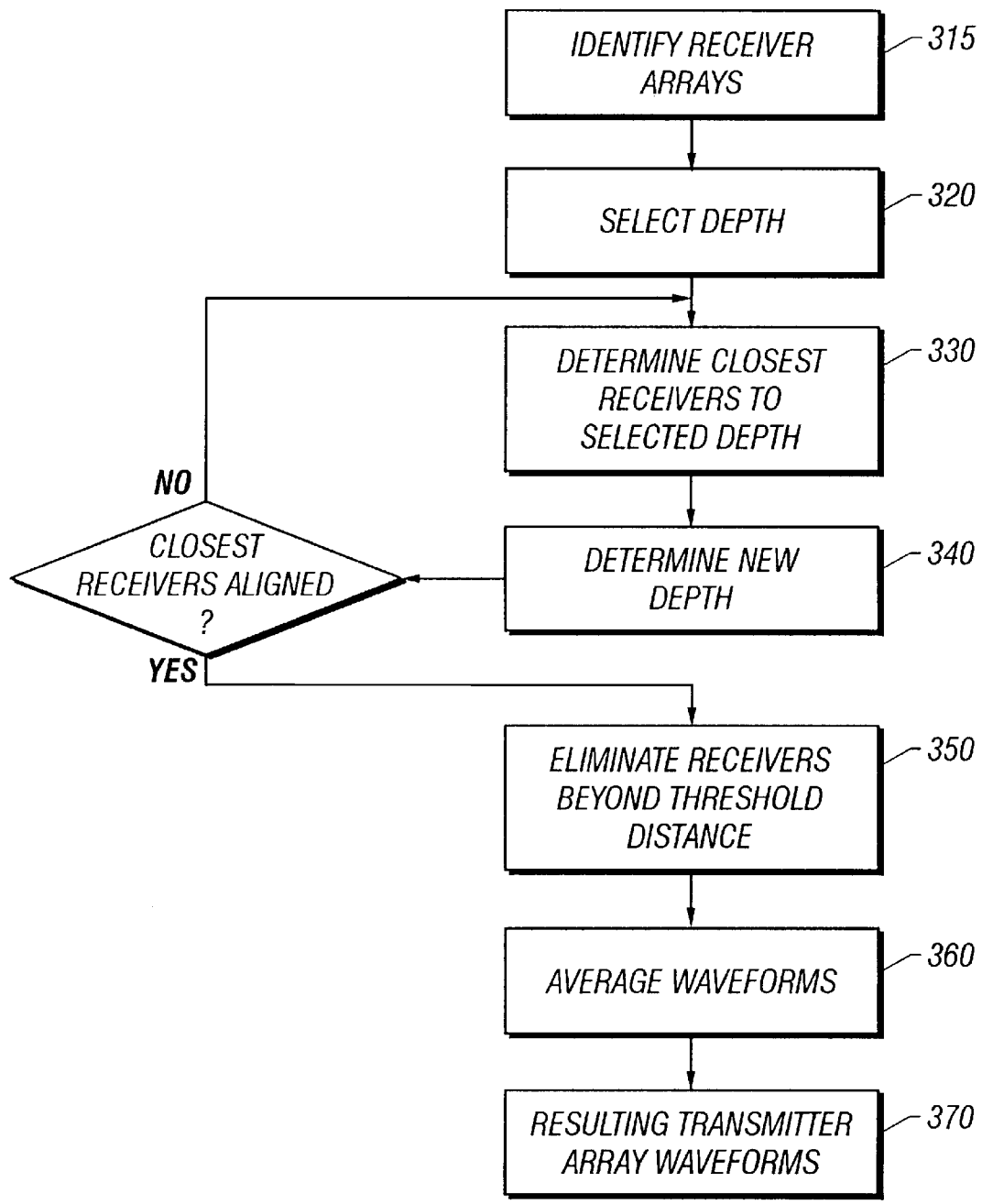

FIGS. 4A and 4B are flowcharts illustrating the operation of the method of the present invention. In FIG. 4A, at block 300, the receiver array waveforms are processed for a depth interval of interest spanned by the receiver array to generate the receiver array Δt measurement (referred to as $\Delta t_{RA}$). The transmitter array waveforms are generated at block 305. These waveforms are processed at block 310 to obtain the synthesized transmitter array Δt measurement ($\Delta t_{TA}$). The generation of the transmitter array waveforms is discussed in greater detail in connection with FIG. 4B.

In FIG. 4A, the receiver array Δt measurement ($\Delta t_{RA}$) is averaged with the transmitter array Δt measurement ($\Delta t_{TA}$), per block 380, to obtain a borehole compensated Δt measurement (referred to as $\Delta t_{BHC}$). Block 390 determines if there is more than one transmitter on the borehole tool. For discussion purposes, it is assumed that there is more than one transmitter on the borehole tool and the steps of processing the receiver array waveforms to generate the receiver array Δt measurement ($\Delta t_{RA}$), per block 300; selecting and processing the transmitter array waveforms to generate a transmitter array Δt measurement ($\Delta t_{TA}$), per block 310; and averaging the transmitter array Δt measurement ($\Delta t_{TA}$) with the receiver array Δt measurement ($\Delta t_{RA}$) to obtain a borehole compensated Δt measurement ($\Delta t_{BHC}$) corresponding to each transmitter, per block 380, are repeated for each corresponding transmitter.

At block 400 the borehole compensated Δt measurements ($\Delta t_{BHC}$) corresponding to each transmitter are averaged to obtain a comprehensive borehole compensated Δt measurement ($\Delta t_{BHC}$). The steps described in the flowchart of FIG. 4A are repeated at each spanned depth interval of interest.

FIG. 4B illustrates the transmitter array waveforms generation block 305 of FIG. 4A in detail wherein a set of waveforms are selected as the transmitter array waveforms corresponding to each transmitter. At block 315, the receiver arrays whose transmitter locations fall within the spanned depth interval are identified. A depth is selected per block 320, above the spanned depth interval when the receivers are positioned above the corresponding transmitter, and below the spanned depth interval when the receivers are positioned below the corresponding transmitter. Preferably, the selected depth corresponds to the depth of the receiver nearest the transmitter of the receiver array at the shallowest depth from the identified receiver arrays when the receivers are positioned above the transmitter, and to the depth of the receiver nearest the transmitter of the receiver array at the deepest depth from the identified receiver arrays when the receivers are positioned below the transmitter.

Per block 330, the closest receiver to the selected depth is determined from each identified receiver array. A new depth is then determined at block 340 wherein the mean-squares distance to the new depth from the previously identified closest receiver of each identified receiver array is minimized. The steps of determining a new depth and determining the closest receiver from each identified receiver array to the new depth, blocks 340 and 330, respectively, are repeated until the mean-squares distance from the closest receivers to an aligned depth cannot be reduced.

The set of waveforms corresponding to the resultant closest receivers to the aligned depth are the transmitter array waveforms. However, to further refine a close alignment of transmitter array waveforms, a threshold distance is selected and those waveforms corresponding to receivers having a distance to the aligned depth greater than the threshold distance are eliminated from the transmitter array waveforms per block 350. Also, to reduce computational burdens, at block 360, all waveforms from the same receiver are averaged to produce one averaged waveform. The further refined set of waveforms corresponding to the closest receivers are the transmitter array waveforms per block 370. The transmitter array waveforms are then processed to generate the synthesized transmitter array $\Delta t$ measurement ($\Delta t_{TA}$) as discussed per block 310 in FIG. 4A.

Under ideal conditions (i.e., an in-gauge hole and a centered borehole tool), the transmitter array $\Delta t$ measurement is identical to that of the corresponding receiver array $\Delta t$ measurement. With cave-ins or washouts, the two $\Delta t$ measurement values are different and biased from the true formation $\Delta t$ measurement. Although biased, the $\Delta t$ measurements are biased in a similar magnitude but in the opposite direction from the true $\Delta t$ measurement value. The borehole compensated $\Delta t$ measurement is then derived by averaging the receiver array $\Delta t$ measurement and the transmitter array $\Delta t$ measurement. By eliminating the effect caused by cave-ins or washouts, the borehole compensated $\Delta t$ measurement is close to the true formation value of interest.

The depth derived borehole compensation method of the present invention significantly reduces formation differential time ($\Delta t$) measurement errors due to borehole irregularities such as cave-ins and washouts without the necessity of uniform movement of the borehole tool through the formation.

An example of logs produced in accordance with the method of the present invention is illustrated in FIGS. 5A, 5B and 5C wherein synthetic waveforms are simulated by a finite difference computer code for these examples. To simulate various borehole tool locations, a time-depth file from actual offshore drilling was used to generate the receiver array waveforms. The borehole size varies sinusoidally with a periodicity of 3 feet and with a maximum radial variation of 1 inch. The formation surrounding the borehole consists of four slow beds with a $\Delta t$ measurement of 100 $\mu$seconds/foot and thicknesses of 4 feet, 2 feet, 1 foot, and 6 inches, respectively.

Shown in each of FIGS. 5A, 5B and 5C is a representation of the true formation $\Delta t$ measurement profile 500. The sinusoidal profile illustrated is a good approximation to the two-dimensional cut of a helical borehole. FIG. 5A illustrates a receiver array $\Delta t$ measurement log 450, FIG. 5B illustrates a transmitter array $\Delta t$ measurement log 460, and FIG. 5C illustrates a borehole compensated $\Delta t$ measurement log 470 in accordance with the method of the present invention. It is clear that the receiver array $\Delta t$ measurement log 450 and transmitter array $\Delta t$ measurement log 460 are affected by the sinusoidal hole size variation and, in many places, are biased in opposite directions. In comparison, the borehole compensated $\Delta t$ measurement log 470 is much less affected by the hole size variation and is in good agreement with the true formation $\Delta t$ measurement profile 500.

FIGS. 6A and 6B show, for the same formation profile described in FIGS. 5A, 5B and 5C, a comparison of a receiver array $\Delta t$ measurement log 480 for an in-gauge borehole with a borehole compensated $\Delta t$ measurement log 490 for a helical borehole in accordance with the method of the present invention. With the receiver array $\Delta t$ measurement log 480 of the in-gauge borehole representing the log obtainable under ideal conditions, the agreement between the receiver array $\Delta t$ measurement log 480 and the borehole compensated $\Delta t$ measurement log 490 illustrates the effectiveness of the borehole compensation method of the invention.

Figure 7A:
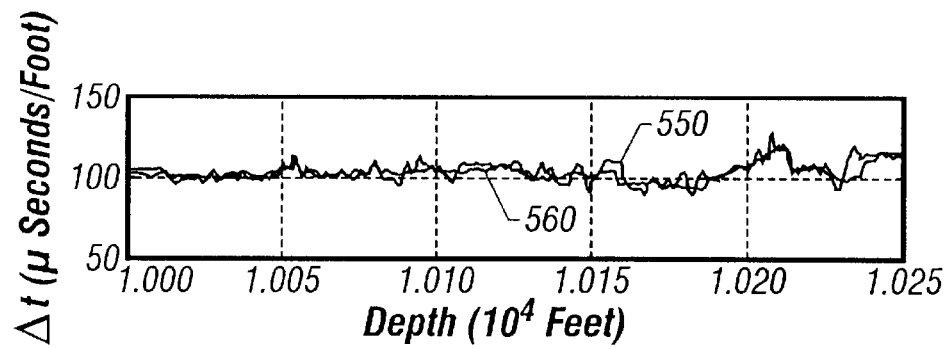
FIGS. 7A, 7B and 7C are logs illustrating, respectively, a sonic $\Delta t$ log without borehole compensation, a wireline caliper log indicating irregularities in the borehole measured, and a sonic $\Delta t$ log including the borehole compensation according to the method of the present invention.
Figure 7B:
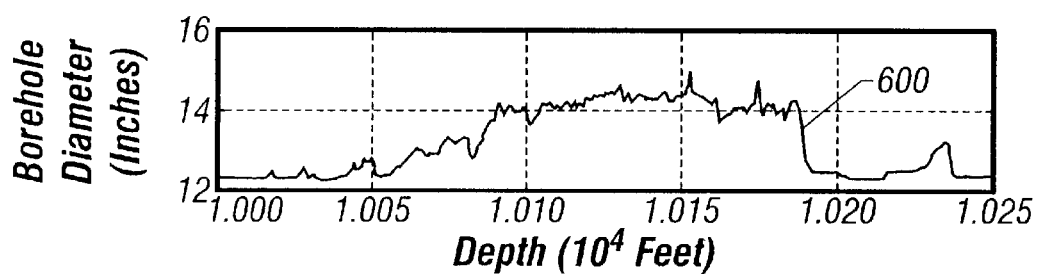
Figure 7C:
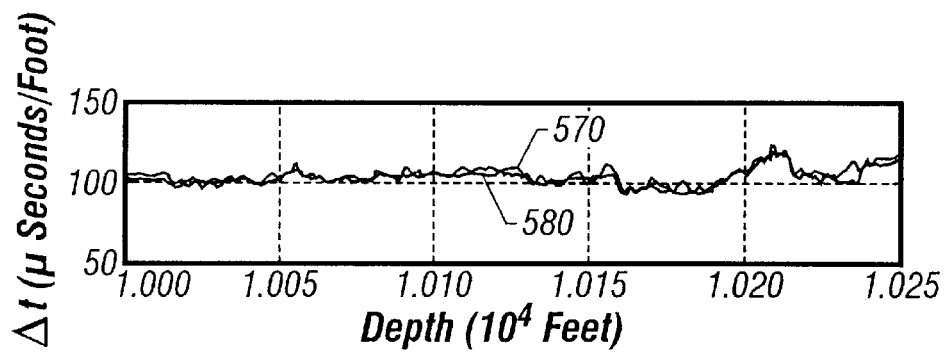

The advantages of the invention can be particularly appreciated with reference to FIGS. 7A, 7B and 7C. FIGS. 7A, 7B and 7C are based on actual sonic logs from an offshore well location and illustrate a while-drilling and wireline log comparison without (FIG. 7A) and with (FIG. 7C) the borehole compensation method of the present invention. The sonic waveforms are displayed for the depth interval of 10,000–10,250 feet. A wireline caliper log 600 in FIG. 7B indicates that there is a washout in the borehole at the interval 10,050–10,195 feet.

FIG. 7A illustrates a sonic while-drilling log 550 and a sonic wireline log 560 without the borehole compensation method, and FIG. 7C illustrates a sonic while-drilling log 570 and a sonic wireline log 580 with the borehole compensation method. Without the borehole compensation, the discrepancy between the sonic while-drilling log 550 and sonic wireline log 560 is more pronounced in the enlarged hole section (e.g., 10,050–10,195 feet). In comparison, the two borehole compensated logs, the sonic while-drilling log 570 and sonic wireline log 580, show much better agreement, illustrating the improved results of applying the borehole compensation method of the invention. The depth derived borehole compensation method of the present invention, used for acoustic or electromagnetic waveform signals, significantly reduces differential time measurement errors due to borehole irregularities such as cave-ins and washouts without the necessity of uniform movement of the borehole tool through the formation.

However, the time-depth measurements recorded at the borehole are important for synthesizing the transmitter array $\Delta t$ measurements of the present invention. Any depth registration errors, therefore, can affect the final $\Delta t$ measurements. However, there is no direct measure of depth registration errors. In order to interpret and assess the quality of the receiver array/transmitter array measurements, certain quality control logs are used, such as coherency logs from the receiver array and transmitter array wherein the coherency varies between 0 and 1. Generally, the $\Delta t$ is more reliable when the coherency value is higher. Another quality control log is, for example, the slowness-time plane projections from the receiver array and transmitter array data, as disclosed in U.S. Pat. No. 4,543,648, which is incorporated herein by reference. A new pipe indicator log is also beneficial because the depth registration error often occurs where a new drilling pipe is added to the drill string.

Processing results are also improved by increasing the total number of waveforms used by the synthesized transmitter array and by the smallest departure (in root-mean-squares distance) of the synthesized transmitter array waveforms from a straight line. For example, the smaller the departure, the closer the transmitter array waveforms are aligned at the same depth and therefore the more reliable the transmitter array log, and the larger the departure, the less reliable the transmitter array log, which is a factor considered in interpretation of the transmitter array log.

The integration of the $\Delta t$ difference (between the receiver array and transmitter array logs) with depth also gives a qualitative indication of borehole shape variation. The depth sampling of waveforms may also be used as a quality control measure wherein the quality of the transmitter array log is higher when the rate of penetration is slower and the data sampling measurements are denser.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A method of borehole compensation of characteristic measurements of earth formations penetrated by a borehole, said method comprising the steps of:
    a) deploying a borehole tool in said borehole, said borehole tool including a depth measurement, at least one transmitter, and a plurality of receivers spaced apart from each said at least one transmitter, each said at least one transmitter generating waveforms to which said receivers are responsive;
    b) obtaining from said borehole tool differential time measurements associated with said waveforms;
    c) generating a receiver array differential time measurement for a depth interval spanned by said receivers by processing receiver array waveforms relevant to said spanned depth interval;
    d) selecting transmitter array waveforms corresponding to each transmitter and acquired when each said transmitter is located within said spanned depth interval;
    e) generating a synthesized transmitter array differential time measurement corresponding to each transmitter by processing said transmitter array waveforms; and
    f) averaging said receiver array differential time measurement with said transmitter array differential time measurement to obtain a borehole compensated differential time measurement corresponding to each transmitter.

2. The method of claim 1, further comprising repeating said steps b–f at each spanned depth interval of interest to produce a log of said borehole compensated differential time measurements.

3. The method of claim 1, further including:
    averaging all said borehole compensated differential time measurements corresponding to each transmitter, when said borehole tool includes more than one transmitter, to obtain a comprehensive borehole compensated differential time measurement.

4. The method of claim 2, wherein selecting said transmitter array waveforms includes the steps of:
    identifying all the receiver arrays whose transmitter locations fall within said spanned depth interval; and
    selecting a set of waveforms from said identified receiver arrays to obtain said transmitter array waveforms.

5. The method of claim 4, wherein selecting said set of waveforms includes the steps of:
    selecting a depth above said spanned depth interval when said receivers are positioned above said corresponding transmitter;
    determining, from each identified receiver array, the closest receiver to said selected depth;
    determining a new depth wherein the mean-squares distance to said new depth from said closest receivers is minimized;
    determining, from each identified receiver array, the closest receiver to said new depth; and
    repeating said steps of determining a new depth and determining said closest receiver from each identified receiver array until the mean-squares distance from said closest receivers to an aligned depth cannot be reduced; and
    wherein the set of waveforms corresponding to said closest receivers are said transmitter array waveforms.

6. The method of claim 5, wherein, when more than one waveform is acquired from the same receiver, the waveforms are averaged to obtain one averaged corresponding waveform.

7. The method of claim 5, wherein said selected depth corresponds to the depth of the receiver nearest said corresponding transmitter of the receiver array at the shallowest depth from said identified receiver arrays when said receivers are positioned above said corresponding transmitter.

8. The method of claim 5, further including:
    selecting a threshold distance; and
    eliminating from said transmitter array waveforms all waveforms corresponding to receivers having a distance to said aligned depth greater than said threshold distance.

9. The method of claim 4, wherein selecting said set of waveforms includes the steps of:
    selecting a depth below said spanned depth interval when said receivers are positioned below said corresponding transmitter;
    determining, from each identified receiver array, the closest receiver to said selected depth;
    determining a new depth wherein the mean-squares distance to said new depth from said closest receivers is minimized;
    determining, from each identified receiver array, the closest receiver to said new depth; and
    repeating said steps of determining a new depth and determining said closest receiver from each identified receiver array until the mean-squares distance from said closest receivers to an aligned depth cannot be reduced; and
    wherein the set of waveforms corresponding to said closest receivers are said transmitter array waveforms.

10. The method of claim 9, wherein, when more than one waveform is acquired from the same receiver, the waveforms are averaged to obtain one averaged corresponding waveform.

11. The method of claim 9, wherein said selected depth corresponds to the depth of the receiver nearest said corresponding transmitter of the receiver array at the deepest depth from said identified receiver arrays when said receivers are positioned below said corresponding transmitter.

12. The method of claim 9, further including:
selecting a threshold distance; and
eliminating from said transmitter array waveforms all waveforms corresponding to receivers having a distance to said aligned depth greater than said threshold distance.

13. The method of claim 1, wherein said waveforms are representative of acoustic waves.

14. The method of claim 1, wherein said waveforms are representative of electromagnetic waves.

15. A method of borehole compensation of characteristic measurements of earth formations penetrated by a borehole, said method comprising the steps of:
   a) deploying a borehole tool in said borehole, said borehole tool including a depth measurement, at least one transmitter, and a plurality of receivers spaced above and apart from each said at least one transmitter, each said at least one transmitter generating waveforms to which said receivers are responsive;
   b) obtaining from said borehole tool differential time measurements associated with said waveforms;
   c) generating a receiver array differential time measurement for a depth interval spanned by said receivers by processing receiver array waveforms relevant to said spanned depth interval;
   d) identifying all receiver arrays whose transmitter locations fall within said spanned depth interval;
   e) selecting a set of waveforms from said identified receiver arrays to obtain transmitter array waveforms corresponding to each transmitter, including the steps of;
   selecting a depth above said spanned depth interval;
   determining, from each identified receiver array, the closest receiver to said selected depth; and
   determining a new depth wherein the mean-squares distance to said new depth from said closest receivers is minimized;
   f) determining, from each identified receiver array, the closest receiver to said new depth;
   g) repeating said steps of determining a new depth and determining said closest receiver from each identified receiver array until the mean-squares distance from said closest receivers to an aligned depth cannot be reduced;
   h) averaging the waveforms from the same receiver to obtain one averaged corresponding waveform, when more than one waveform is acquired by the same receiver; wherein the set of waveforms corresponding to said closest receivers are said transmitter array waveforms;
   i) generating a synthesized transmitter array differential time measurement corresponding to each transmitter by processing said transmitter array waveforms; and
   j) averaging said receiver array differential time measurement with said transmitter array differential time measurement to obtain a borehole compensated differential time measurement corresponding to each transmitter.

16. The method of claim 15, further comprising repeating said steps b–j at each spanned depth interval of interest to produce a log of said borehole compensated differential time measurements.

17. The method of claim 15, further including:
averaging all said borehole compensated differential time measurements corresponding to each transmitter, when said borehole tool includes more than one transmitter, to obtain a comprehensive borehole compensated differential time measurement.

18. The method of claim 16, wherein said selected depth corresponds to the depth of the receiver nearest said corresponding transmitter of the receiver array at the shallowest depth from said identified receiver arrays.

19. The method of claim 16, further including:
selecting a threshold distance; and
eliminating from said transmitter array waveforms all waveforms corresponding to receivers having a distance to said aligned depth greater than said threshold distance.

20. The method of claim 15, wherein said waveforms are representative of acoustic waves.

21. The method of claim 15, wherein said waveforms are representative of electromagnetic waves.

22. A method of borehole compensation of characteristic measurements of earth formations penetrated by a borehole, said method comprising the steps of:
   a) deploying a borehole tool in said borehole, said borehole tool including a depth measurement, at least one transmitter, and a plurality of receivers spaced below and apart from each said at least one transmitter, each said at least one transmitter generating waveforms to which said receivers are responsive;
   b) obtaining from said borehole tool differential time measurements associated with said waveforms;
   c) generating a receiver array differential time measurement for a depth interval spanned by said receivers by processing receiver array waveforms relevant to said spanned depth interval;
   d) identifying all receiver arrays whose transmitter locations fall within said spanned depth interval;
   e) selecting a set of waveforms from said identified receiver arrays to obtain transmitter array waveforms corresponding to each transmitter, including the steps of;
   selecting a depth below said spanned depth interval;
   determining, from each identified receiver array, the closest receiver to said selected depth; and
   determining a new depth wherein the mean-squares distance to said new depth from said closest receivers is minimized;
   f) determining, from each identified receiver array, the closest receiver to said new depth;
   g) repeating said steps of determining a new depth and determining said closest receiver from each identified receiver array until the mean-squares distance from said closest receivers to an aligned depth cannot be reduced;
   h) averaging the waveforms from the same receiver to obtain one averaged corresponding waveform, when more than one waveform is acquired by the same receiver; wherein the set of waveforms corresponding to said closest receivers are said transmitter array waveforms;
   i) generating a synthesized transmitter array differential time measurement corresponding to each transmitter by processing said transmitter array waveforms; and
   j) averaging said receiver array differential time measurement with said transmitter array differential time measurement to obtain a borehole compensated differential time measurement corresponding to each transmitter.

23. The method of claim 22, further comprising repeating said steps b–j at each spanned depth interval of interest to produce a log of said borehole compensated differential time measurements.

24. The method of claim 22, further including:

averaging all said borehole compensated differential time measurements corresponding to each transmitter, when said borehole tool includes more than one transmitter, to obtain a comprehensive borehole compensated differential time measurement.

25. The method of claim 23, wherein said selected depth corresponds to the depth of the receiver nearest said corresponding transmitter of the receiver array at the deepest depth from said identified receiver arrays.

26. The method of claim 23, further including:

selecting a threshold distance; and eliminating from said transmitter array waveforms all waveforms corresponding to receivers having a distance to said aligned depth greater than said threshold distance.

27. The method of claim 22, wherein said waveforms are representative of acoustic waves.

28. The method of claim 22, wherein said waveforms are representative of electromagnetic waves.

29. A method of borehole compensation of acoustic waveforms introduced into earth formations from inside a borehole which penetrates said earth formations, wherein acoustic waves caused by acoustic pulses generated by at least one repetitively actuating transmitter located on a borehole tool which is moved along said borehole generate acoustic waveforms detected at a plurality of receivers spaced along the borehole axis of said borehole tool, and including a depth measurement of said borehole tool in said borehole, said method comprising the steps of:

a) generating a receiver array differential time measurement for a depth interval spanned by said receivers by processing receiver array waveforms relevant to said spanned depth interval;

b) selecting transmitter array waveforms corresponding to each transmitter and acquired when each said transmitter is located within said spanned depth interval including the steps of:

identifying all the receiver arrays whose transmitter locations fall within said spanned depth interval; and selecting a set of waveforms from said identified receiver arrays to obtain said transmitter array waveforms;

c) generating a synthesized transmitter array differential time measurement corresponding to each transmitter by processing said transmitter array waveforms;

d) averaging said receiver array differential time measurement with said transmitter array differential time measurement to obtain a borehole compensated differential time measurement corresponding to each transmitter; and e) repeating said steps a–d at each spanned depth interval of interest.

30. The method of claim 29, further including:

averaging all said borehole compensated differential time measurements corresponding to each transmitter, when said borehole tool includes more than one transmitter, to obtain a comprehensive borehole compensated differential time measurement.

31. The method of claim 29, wherein selecting said set of waveforms from said identified receiver arrays to obtain said transmitter array waveforms includes the steps of:

selecting a depth above said spanned depth interval when said receivers are positioned above said corresponding transmitter;

determining, from each identified receiver array, the closest receiver to said selected depth;

determining a new depth wherein the mean-squares distance to said new depth from said closest receivers is minimized;

determining, from each identified receiver array, the closest receiver to said new depth;

repeating said steps of determining a new depth and determining said closest receiver from each identified receiver array until the mean-squares distance from said closest receivers to an aligned depth cannot be reduced; and averaging the waveforms from the same receiver to obtain one averaged corresponding waveform, when more than one waveform is acquired by the same receiver;

wherein the set of waveforms corresponding to said closest receivers are said transmitter array waveforms.

32. The method of claim 31, wherein said selected depth corresponds to the depth of the receiver nearest said corresponding transmitter of the receiver array at the shallowest depth from said identified receiver arrays.

33. The method of claim 31, further including:

selecting a threshold distance; and eliminating from said transmitter array waveforms all waveforms corresponding to receivers having a distance to said aligned depth greater than said threshold distance.

34. The method of claim 29, wherein selecting said set of waveforms from said identified receiver arrays to obtain said transmitter array waveforms includes the steps of:

selecting a depth below said spanned depth interval when said receivers are positioned below said corresponding transmitter;

determining, from each identified receiver array, the closest receiver to said selected depth;

determining a new depth wherein the mean-squares distance to said new depth from said closest receivers is minimized;

determining, from each identified receiver array, the closest receiver to said new depth;

repeating said steps of determining a new depth and determining said closest receiver from each identified receiver array until the mean-squares distance from said closest receivers to an aligned depth cannot be reduced; and averaging the waveforms from the same receiver to obtain one averaged corresponding waveform, when more than one waveform is acquired by the same receiver;

wherein the set of waveforms corresponding to said closest receivers are said transmitter array waveforms.

35. The method of claim 34, wherein said selected depth corresponds to the depth of the receiver nearest said corresponding transmitter of the receiver array at the deepest depth from said identified receiver arrays.

36. The method of claim 34, further including:

selecting a threshold distance; and eliminating from said transmitter array waveforms all waveforms corresponding to receivers having a distance to said aligned depth greater than said threshold distance.

37. A method of borehole compensation of electromagnetic waveforms introduced into earth formations from inside a borehole which penetrates said earth formations, wherein electromagnetic waves caused by electromagnetic pulses generated by at least one repetitively actuating transmitter antenna located on a borehole tool which is moved along said borehole generate electromagnetic waveforms detected at a plurality of receiver antennas spaced along the borehole axis of said borehole tool, and including a depth measurement of said borehole tool in said borehole, said method comprising the steps of:

a) generating a receiver array differential time measurement for a depth interval spanned by said receiver antennas by processing receiver array waveforms relevant to said spanned depth interval;

b) selecting transmitter array waveforms corresponding to each transmitter antenna and acquired when each said transmitter antenna is located within said spanned depth interval including the steps of:

identifying all the receiver arrays whose transmitter antenna locations fall within said spanned depth interval; and selecting a set of waveforms from said identified receiver arrays to obtain said transmitter array waveforms;

c) generating a synthesized transmitter array differential time measurement corresponding to each transmitter antenna by processing said transmitter array waveforms;

d) averaging said receiver array differential time measurement with said transmitter array differential time measurement to obtain a borehole compensated differential time measurement corresponding to each transmitter antenna; and e) repeating said steps a–d at each spanned depth interval of interest.

38. The method of claim 37, further including:

averaging all said borehole compensated differential time measurements corresponding to each transmitter antenna, when said borehole tool includes more than one transmitter antenna, to obtain a comprehensive borehole compensated differential time measurement.

39. The method of claim 37, wherein selecting said set of waveforms from said identified receiver arrays to obtain said transmitter array waveforms includes the steps of:

selecting a depth above said spanned depth interval when said receiver antennas are positioned above said corresponding transmitter;

determining, from each identified receiver array, the closest receiver antenna to said selected depth;

determining a new depth wherein the mean-squares distance to said new depth from said closest receiver antennas is minimized;

determining, from each identified receiver array, the closest receiver antenna to said new depth;

repeating said steps of determining a new depth and determining said closest receiver antenna from each identified receiver array until the mean-squares distance from said closest receiver antennas to an aligned depth cannot be reduced; and averaging the waveforms from the same receiver antenna to obtain one averaged corresponding waveform, when more than one waveform is acquired by the same receiver antenna; wherein the set of waveforms corresponding to said closest receiver antennas are said transmitter array waveforms.

40. The method of claim 39, wherein said selected depth corresponds to the depth of the receiver antenna nearest said corresponding transmitter antenna of the receiver array at the shallowest depth from said identified receiver arrays.

41. The method of claim 39, further including:

selecting a threshold distance; and eliminating from said transmitter array waveforms all waveforms corresponding to receiver antennas having a distance to said aligned depth greater than said threshold distance.

42. The method of claim 37, wherein selecting said set of waveforms from said identified receiver arrays to obtain said transmitter array waveforms includes the steps of:

selecting a depth below said spanned depth interval when said receiver antennas are positioned below said corresponding transmitter antenna;

determining, from each identified receiver array, the closest receiver antenna to said selected depth;

determining a new depth wherein the mean-squares distance to said new depth from said closest receiver antennas is minimized;

determining, from each identified receiver array, the closest receiver antenna to said new depth;

repeating said steps of determining a new depth and determining said closest receiver antenna from each identified receiver array until the mean-squares distance from said closest receiver antennas to an aligned depth cannot be reduced; and averaging the waveforms from the same receiver antenna to obtain one averaged corresponding waveform, when more than one waveform is acquired by the same receiver antenna; wherein the set of waveforms corresponding to said closest receiver antennas are said transmitter array waveforms.

43. The method of claim 42, wherein said selected depth corresponds to the depth of the receiver antenna nearest said corresponding transmitter antenna of the receiver array at the deepest depth from said identified receiver arrays.

44. The method of claim 42, further including:

selecting a threshold distance; and eliminating from said transmitter array waveforms all waveforms corresponding to receiver antennas having a distance to said aligned depth greater than said threshold distance.

* * * * *